United States Patent
Kawai et al.

[11] Patent Number: 6,078,685
[45] Date of Patent: *Jun. 20, 2000

[54] IMAGE READING APPARATUS FOR READING A COLOR IMAGE BY IRRADIATING LIGHT ONTO AN OBJECT AND PHOTOELECTRICALLY CONVERTING LIGHT FROM THE OBJECT

[75] Inventors: Takashi Kawai, Yokohama; Hiroshi Sato, Kawasaki; Kazuhito Ohashi, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/516,866

[22] Filed: Aug. 18, 1995

[30] Foreign Application Priority Data

Aug. 22, 1994 [JP] Japan ................................... 6-197073
Aug. 22, 1994 [JP] Japan ................................... 6-197074

[51] Int. Cl.$^7$ ........................................................ G06K 9/00
[52] U.S. Cl. ............................ 382/167; 358/518; 382/323
[58] Field of Search ................................... 382/162, 167, 382/321, 323, 274; 348/223, 324, 315, 316, 281, 282, 272, 265, 230, 241; 358/518, 483

[56] References Cited

U.S. PATENT DOCUMENTS

| | | | |
|---|---|---|---|
| 4,293,871 | 10/1981 | Macovski | 348/324 |
| 4,481,522 | 11/1984 | Jastrzebski et al. | 348/315 |
| 4,718,768 | 1/1988 | Houki et al. | 356/402 |
| 5,121,192 | 6/1992 | Kazui | 348/315 |
| 5,241,377 | 8/1993 | Kaneda | 348/281 |
| 5,340,977 | 8/1994 | Kojima et al. | 348/282 |
| 5,345,320 | 9/1994 | Hirota | 358/518 |
| 5,438,364 | 8/1995 | Maeshima et al. | 348/223 |
| 5,508,742 | 4/1996 | Geerlings et al. | 348/272 |

FOREIGN PATENT DOCUMENTS

0281172 A1  9/1988  European Pat. Off. ......... H04N 9/04

OTHER PUBLICATIONS

European Search Report in corresponding foreign application EP95 30 5816 which cites the references disclosed in this Form PTO-1449.

*Primary Examiner*—Amelia Au
*Assistant Examiner*—Timothy M. Johnson
*Attorney, Agent, or Firm*—Morgan & Finnegan

[57] ABSTRACT

This invention has as its object to provide an image reading apparatus which can prevent color mixing even when a linear image sensor in which charge transfer units are arranged to sandwich light-receiving units of different colors therebetween is used. In order to achieve the object, the image reading apparatus includes: a linear image sensor which is constituted by a plurality of image line sensors (301, 302, 303) respectively having a plurality of color filters, and transfer units (304–309) for transferring charges from the image line sensors, so that a charge obtained by a light-receiving/storage operation of at least one color image line sensor (302) is transferred to the transfer units (306, 307) via the image line sensor (303) of another color; and a subtraction circuit for subtracting a value obtained by multiplying a charge obtained by the light-receiving/storage operation of the image line sensor (303) of the other color with a correction coefficient from the charge transferred via the image line sensor (303) of the other color.

12 Claims, 17 Drawing Sheets

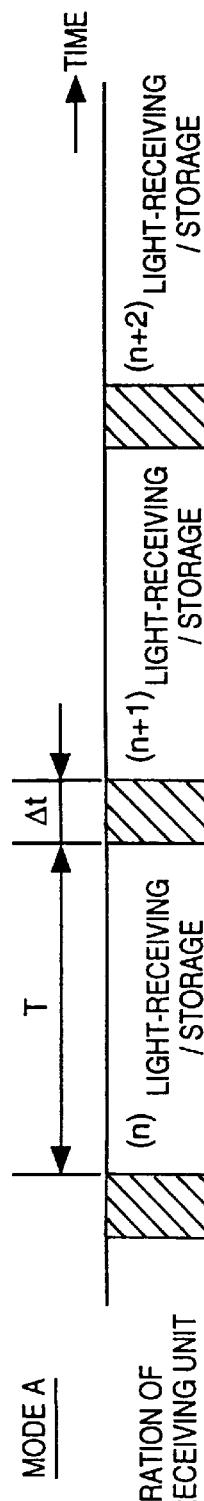
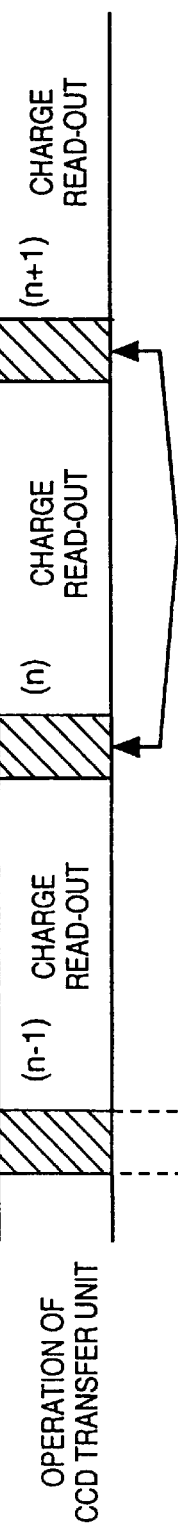
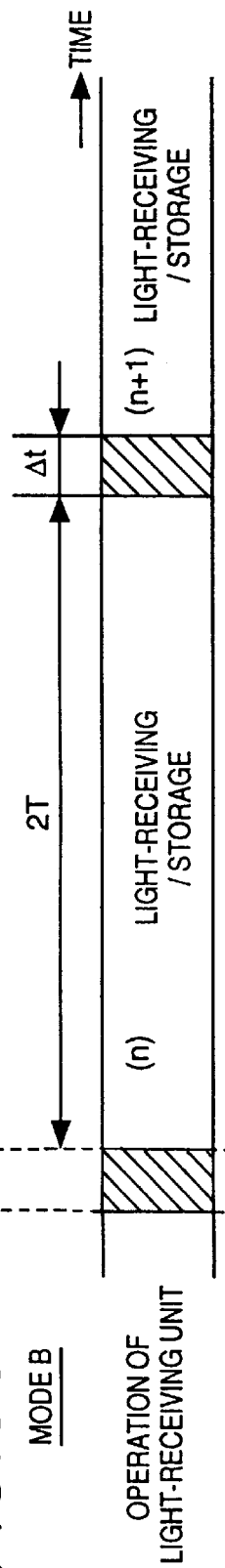

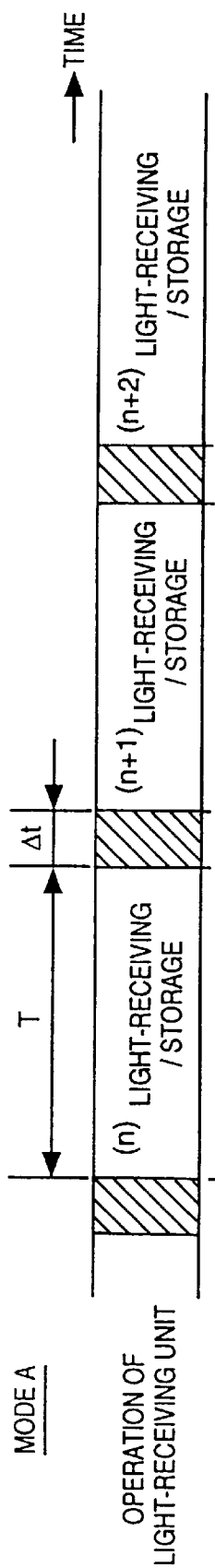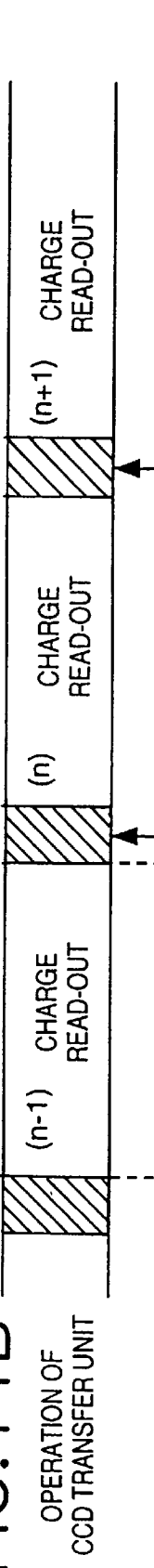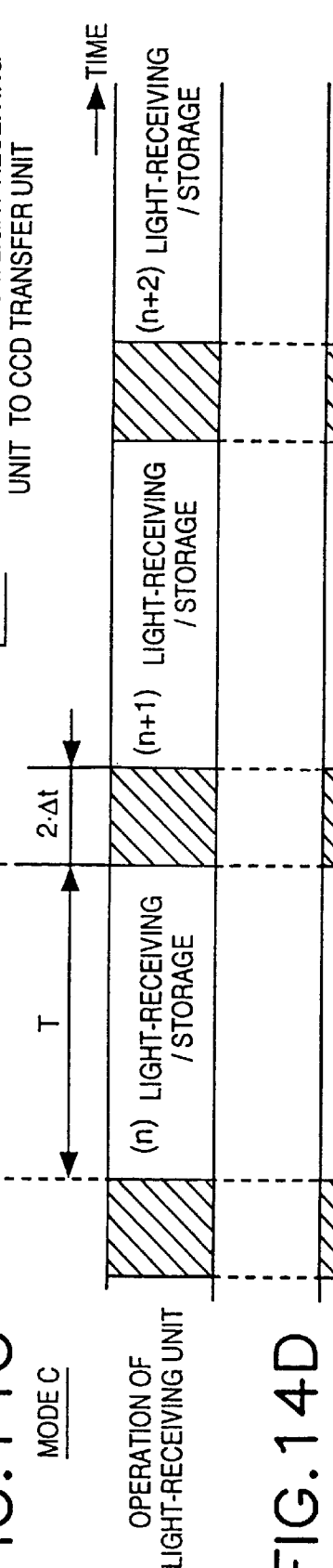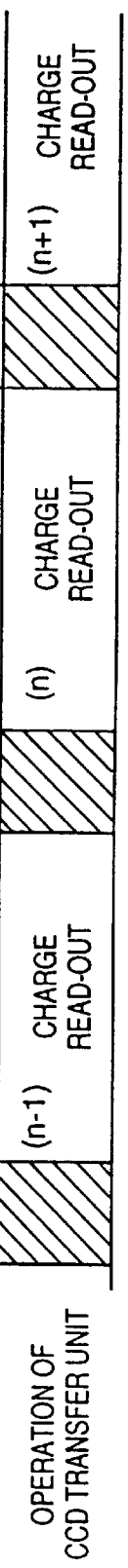

IMAGE READING APPARATUS FOR READING A COLOR IMAGE BY IRRADIATING LIGHT ONTO AN OBJECT AND PHOTOELECTRICALLY CONVERTING LIGHT FROM THE OBJECT

BACKGROUND OF THE INVENTION

The present invention relates to an image reading apparatus, an image processing apparatus, and a method therefor and, more particularly, to an image reading apparatus, an image processing apparatus, and a method therefor using a linear image sensor for performing an intra-pixel transfer/read-out operation.

Conventionally, as a color image reading apparatus using a linear image sensor, an apparatus with the arrangement shown in FIG. 1 is known.

In the color image reading apparatus shown in FIG. 1, an original 212 on an original table glass 211 is illuminated with light using an illumination light source 210 and a reflector 209, and light reflected by the original is imaged on the light-receiving surface of a CCD (color linear image sensor) 201 via a first mirror 208, a second mirror 205, a third mirror 206, and a lens 202. When a portion surrounded by a broken line 207 in FIG. 1 is moved at a velocity V in the direction of an arrow in FIG. 1, and a portion surrounded by a broken line 203 is moved at a velocity V/2 in the direction of an arrow in FIG. 1, the entire image on the original 212 can be read by the CCD 201.

FIG. 2 shows the arrangement of the CCD linear image sensor 201 used in the conventional color image reading apparatus.

Referring to FIG. 2, reference numerals 301, 302, and 303 denote light-receiving units respectively having R (red), G (green), and B (blue) color filters. In each light-receiving unit, diodes for converting photons into charges (electrons in this case) are arranged in units of pixels. Charges generated by light reception for a predetermined period of time are respectively transferred (shifted) to CCD transfer units (charge transfer units) 304, 306, and 308 for ODD pixels and CCD transfer units (charge transfer units) 305, 307, and 309 for EVEN pixels. The charges transferred (shifted) to the CCD transfer units are sequentially transferred in a predetermined direction in the corresponding CCD transfer units while the light-receiving units perform light-receiving and charge storage operations for the next line, and are sequentially converted into voltage signals by amplifiers 310 to 316. Then, these voltage signals are output.

However, as shown in FIG. 2, in the conventional color linear image sensor, since the CCD transfer units for charge transfer are arranged between adjacent ones of the R, G, and B light-receiving units, the interval between the R and G light-receiving units and the interval between the G and B light-receiving units shown in FIG. 2 must be set to be large.

When the interval between adjacent light-receiving unit increases, a memory for correcting the reading positions of R, G, and B signals is required when read R, G, and B signals are subjected to color correction processing such as masking calculations. In this case, as the intervals of the R, G, and B light-receiving unit become larger, the required memory capacity undesirably increases.

Recently, a structure wherein CCD transfer units are disposed to sandwich light-receiving units of different colors therebetween in place of being disposed adjacent to the corresponding light-receiving units is proposed (Japanese Patent Application Nos. 6-187157 and 6-197075).

FIG. 3 shows the arrangement wherein the CCD transfer units are disposed to sandwich the light-receiving units of different colors therebetween. In this case, since the CCD transfer units need not be disposed between the adjacent light-receiving units of the respective colors, the interval between the adjacent ones of the R, G, and B light-receiving units can be greatly reduced and the required memory capacity can also be reduced as compared to a conventional sensor.

However, received and stored charges must be transferred (shifted) to the CCD transfer units via the light-receiving units (pixels) of different colors. When so-called intra-pixel transfer is performed, since each light-receiving unit is receiving light reflected by an original image while charges are passing through the light-receiving units of different colors, color mixing may occur upon transfer.

SUMMARY OF THE INVENTION

The present invention has been made in consideration of the above situation, and has as its object to provide an image reading apparatus, an image processing apparatus, and a method therefor, which can eliminate color mixing even when a linear image sensor in which charge transfer units are disposed to sandwich light-receiving units of different colors therebetween is used.

In order to achieve the above object, an image reading apparatus according to the present invention is characterized by the following arrangement.

More specifically, an image pickup apparatus for reading a color image by irradiating light onto an object, and photoelectrically converting light from the object, comprises: a linear image sensor which comprises a plurality of light-receiving portions corresponding to light components of a plurality of colors, and transfer units which are arranged on two sides of the plurality of light-receiving portions and transfer charges from the light-receiving portions, a charge stored in the light-receiving portion of at least one color being transferred to the transfer unit via the light-receiving portion of another color; and calculation means for performing a calculation of the charge transferred via the light-receiving portion of the other color.

An image reading method according to the present invention is characterized by the following arrangement.

More specifically, an image pickup method for reading a color image by irradiating light onto an object, and photoelectrically converting light from the object, comprises the steps of: preparing a linear image sensor which comprises a plurality of light-receiving portions corresponding to light components of a plurality of colors, and transfer units which are arranged on two sides of the plurality of light-receiving portions and transfer charges from the light-receiving portions, a charge stored in the light-receiving portion of at least one color being transferred to the transfer unit via the light-receiving portion of another color; and performing a calculation of the charge transferred via the light-receiving portion of the other color.

An image pickup apparatus according to the present invention is characterized by the following arrangement.

More specifically, an image pickup apparatus comprises: a first light-receiving sensor; a second light-receiving sensor; transfer means, arranged on a side near the second light-receiving sensor and opposite to the first light-receiving sensor, for reading out charges of the first and second light-receiving sensors; control means for reading out a charge signal of the second light-receiving sensor via the transfer means, and for transferring a charge signal of the first light-receiving sensor toward the transfer means via the second light-receiving sensor, and then reading out the charge signal via the transfer means; and subtraction means for subtracting the signals of the first and second light-receiving sensors read out via the transfer means.

An image processing apparatus according to the first aspect of the present invention is characterized by the following arrangement.

More specifically, an image processing apparatus comprises: reading means for reading a color image by an intra-pixel transfer method; acquisition means for acquiring color mixing information between different color signals from signals obtained by reading a standard original by driving the reading means in at least two different modes; and correction means for correcting color mixing of image data read by the reading means on the basis of the color mixing information acquired by the acquisition means.

An image processing apparatus according to the second aspect of the present invention is characterized by the following arrangement.

More specifically, an image processing apparatus comprises: reading means for reading a color image by an intra-pixel transfer method; acquisition means for acquiring color mixing information from a first color component to a second color component signal on the basis of a signal obtained by reading a standard original by the reading means; and correction means for correcting color mixing of image data read by the reading means on the basis of the color mixing information acquired by the acquisition means.

An image processing method according to the first aspect of the present invention is characterized by the following arrangement.

More specifically, an image processing method comprises: the acquisition step of acquiring color mixing information between different color signals from signals obtained by reading a standard original by driving reading means for reading a color image by an intra-pixel transfer method in at least two different modes; and the correction step of correcting color mixing of image data read by the reading means on the basis of the color mixing information acquired in the acquisition step.

An image processing method according to the second aspect of the present invention is characterized by the following arrangement.

More specifically, an image processing method comprises: the acquisition step of acquiring color mixing information from a first color component to a second color component signal on the basis of a signal obtained by reading a standard original by reading means for reading a color image by an intra-pixel transfer method; and the correction step of correcting color mixing of image data read by the reading means on the basis of the color mixing information acquired in the acquisition step.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 9A, 9B, 9C and 9D are views is a view for explaining two image reading modes;

FIGS. 14A, 14B, 14C and 14D are views for explaining another example of two image reading modes;

DETAILED DESCRIPTION OF THE PREFERRED EMBODIMENTS

The preferred embodiments of the present invention will be described in detail hereinafter with reference to the accompanying drawings.

First Embodiment

Figure 4:
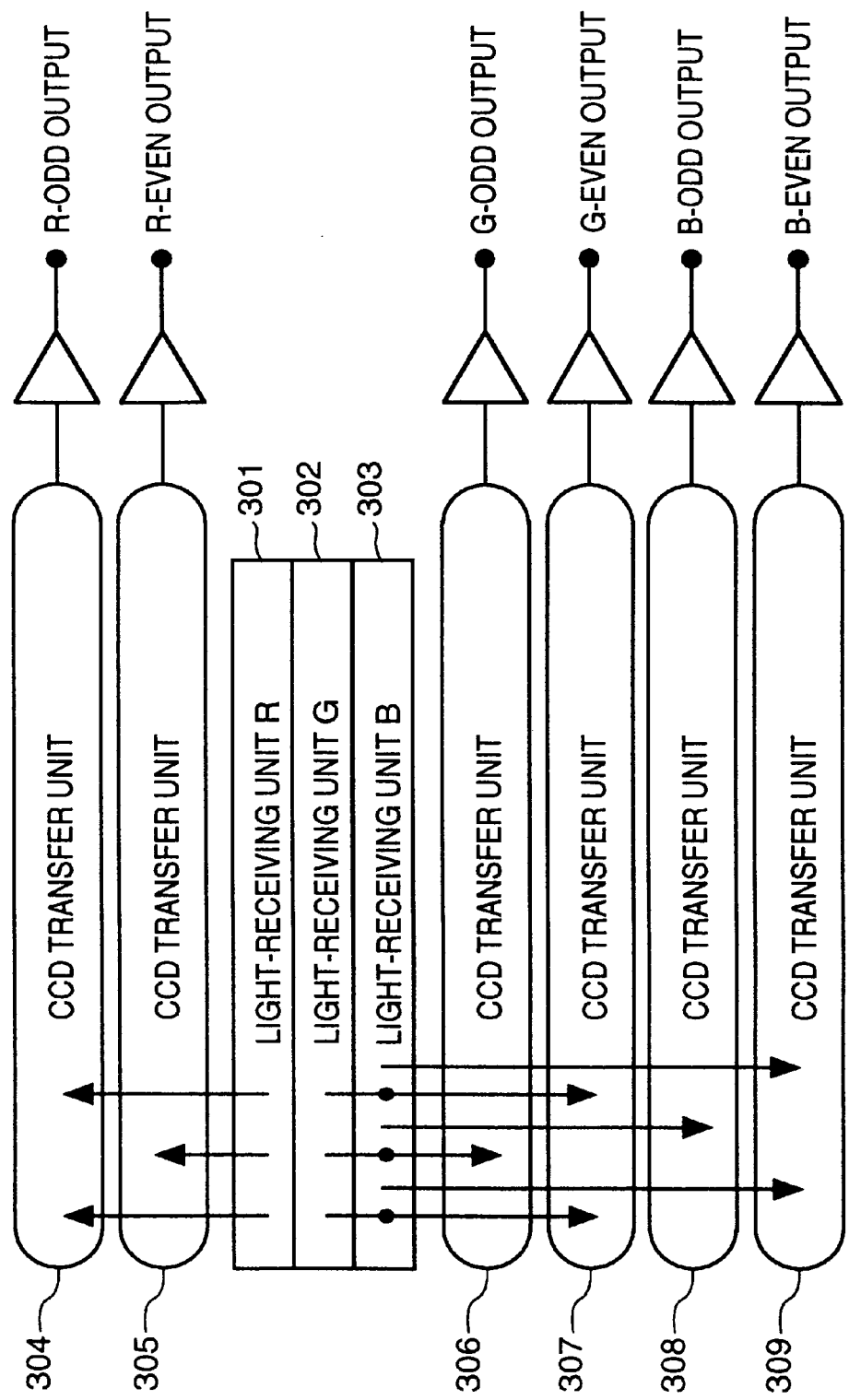
FIG. 4 is a view showing the arrangement of a CCD linear image sensor of an image reading apparatus as the basis of the present invention.
Figure 5:
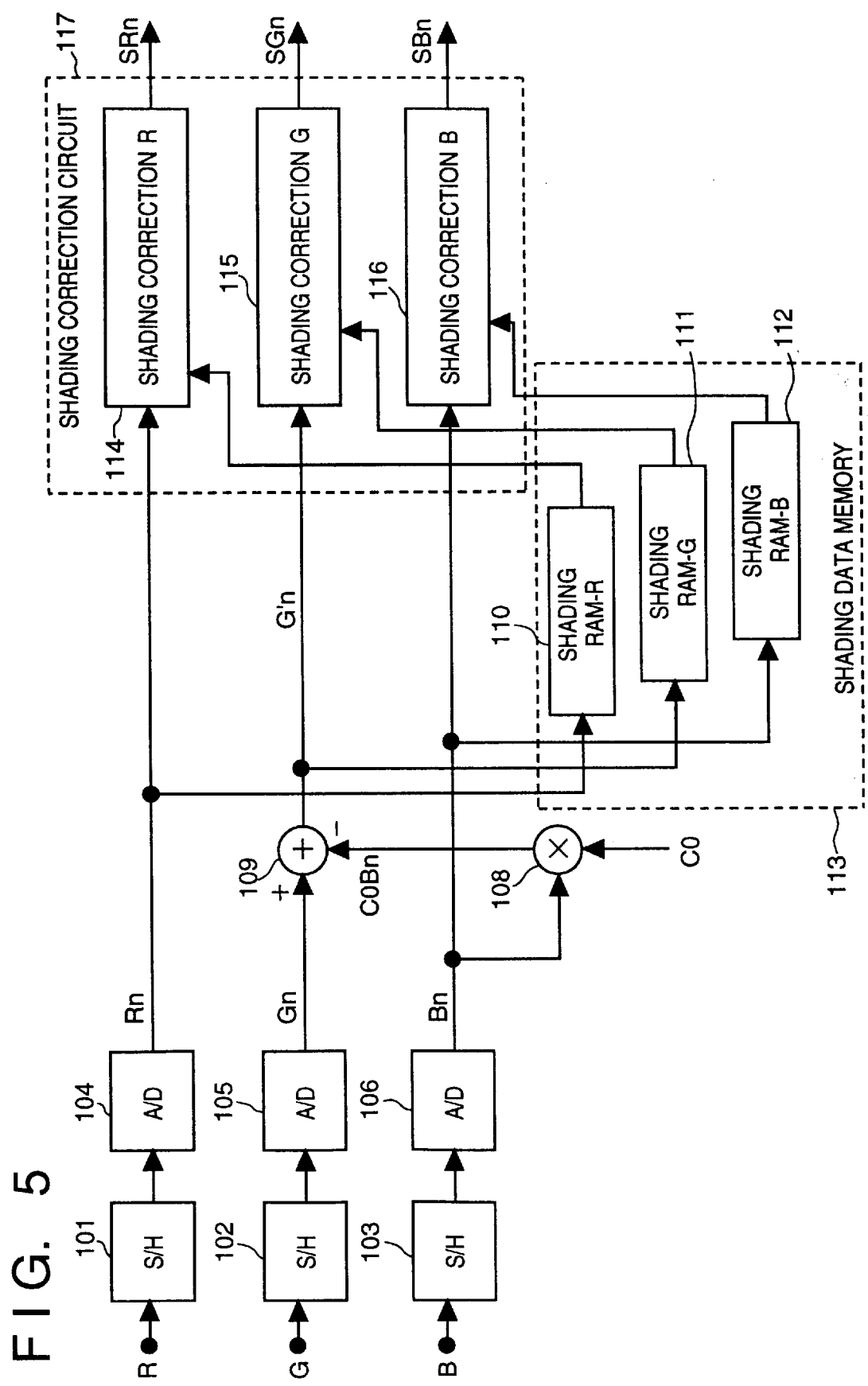
FIG. 5 is a view showing the arrangement of the image reading apparatus according to the first embodiment of the present invention.

FIG. 4 is a view showing the arrangement of a CCD linear image sensor used in a color image reading apparatus according to the first embodiment of the present invention, and FIG. 5 is a view showing the arrangement of a color mixing correction circuit for correcting color mixing in the linear image sensor shown in FIG. 4.

Figure 3:
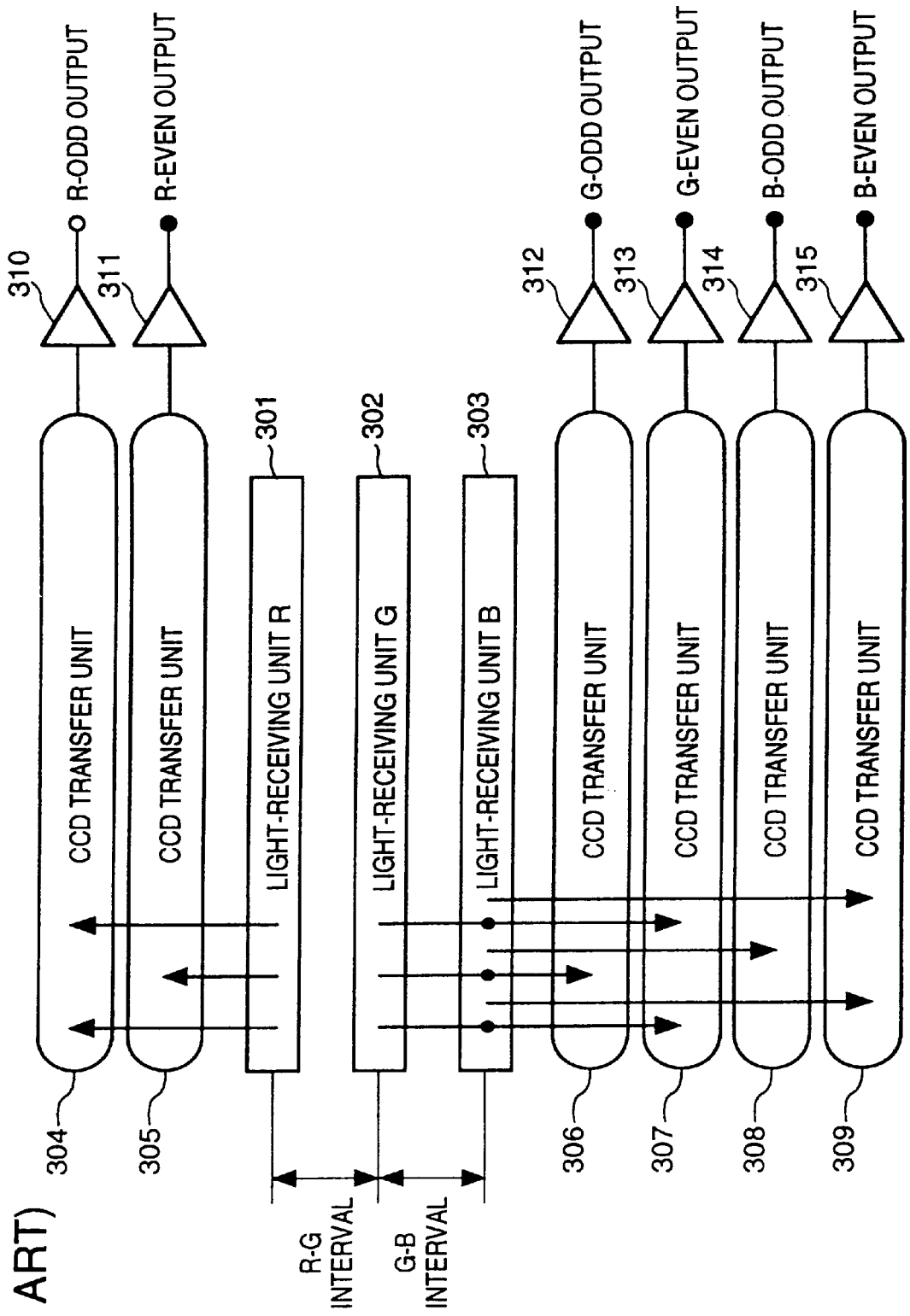
FIG. 3 is a view showing another arrangement of a CCD linear image sensor of the conventional color image reading apparatus.

Referring to FIG. 4, components denoted by reference numeral 301 to 309 are the same as those in FIG. 3. Unlike in FIG. 3, the light-receiving units 301, 302, and 303 respectively having R (red), G (green), and B (blue) color-separation filters in FIG. 4 are arranged adjacent to each other. When the light-receiving units 301 to 303 read an image, a charge stored in the R light-receiving unit 301 is directly transferred to CCD transfer units 304 and 305, and a charge stored in the B light-receiving unit 303 is transferred to CCD transfer units 308 and 309, while a charge stored in the G light-receiving unit 302 is temporarily transferred to the B light-receiving unit, and is then transferred to CCD transfer units 306 and 307.

Figure 6:
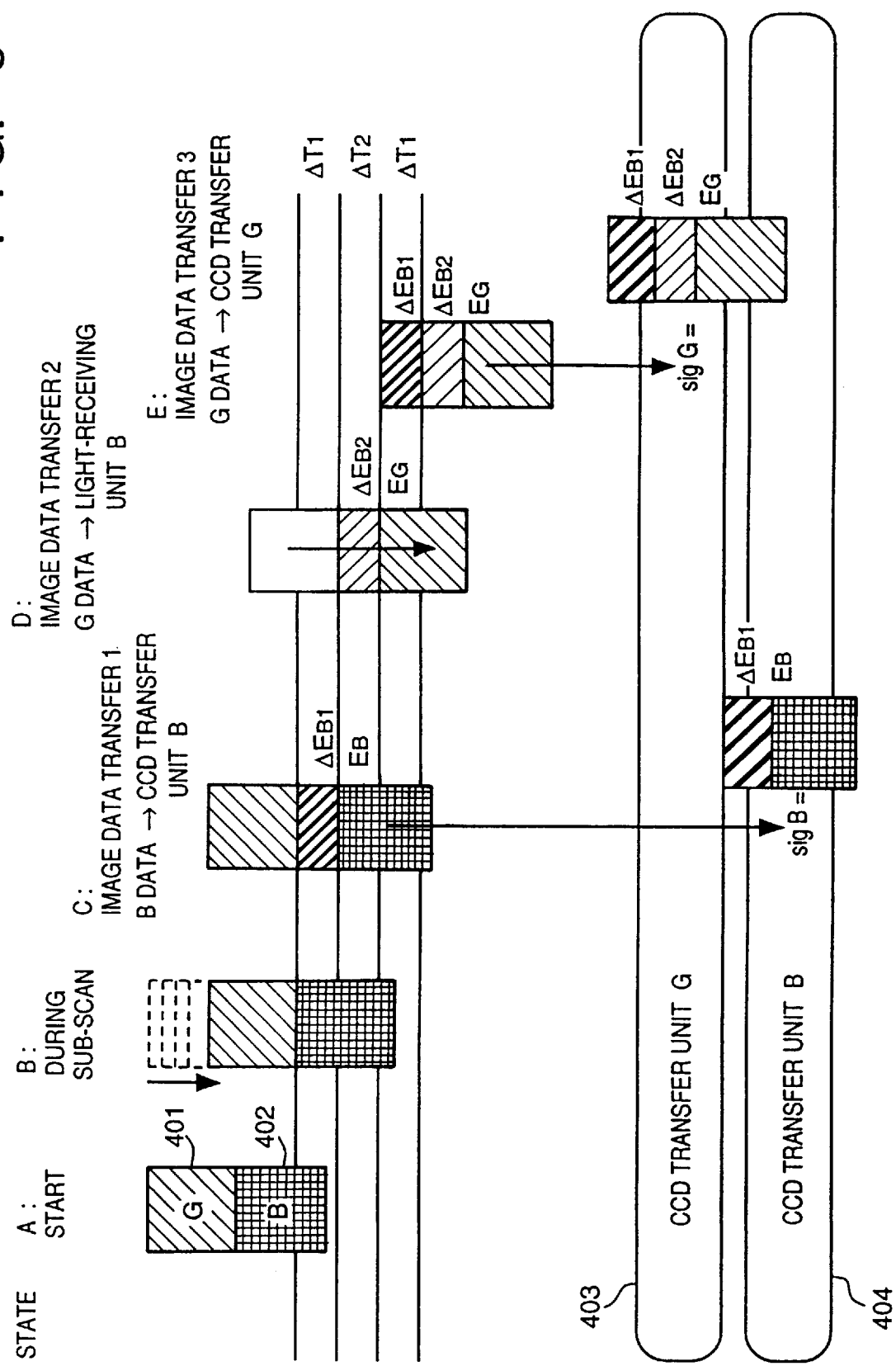
FIG. 6 is a view showing the movement of charges in intra-pixel transfer according to the present invention.

FIG. 6 shows the model of transfer of charges stored in the G and B light-receiving units. In FIG. 6, reference numeral 401 denotes one pixel of the G light-receiving unit; and 402, one pixel of the B light-receiving unit. When the image reading operation is started from state A:start in FIG. 6, the light-receiving units 401 and 402 scan on an original image in the direction of an arrow in state B. When these units scan for about one pixel, a charge $E_B$ stored in the B light-receiving unit 402 is transferred to a B CCD transfer unit 404 (state C in FIG. 6).

Let $\Delta T_1$ be the charge transfer time from the light-receiving unit to the CCD transfer unit. Then, the light-receiving unit continues the scanning operation and stores the charge $\Delta E_{B1}$ during the time $\Delta T_1$. Therefore, the total charge amount, sigB, upon completion of transfer of the charge stored in the B light-receiving unit is given by:

$$sigB = E_B + \Delta E_{B1} \quad (1)$$

Then, as shown in state D, a charge $E_G$ stored in the G light-receiving unit 401 is transferred to the B light-receiving unit 402 from which the charge has already been transferred. Let $\Delta T_2$ be the charge transfer time from G light-receiving unit to the B light-receiving unit. Then, a charge $\Delta E_{B2}$ is stored in the B light-receiving unit during the time $\Delta T_2$, and color mixing of G and B ($E_G + \Delta E_{B2}$) occurs. Furthermore, the charge transferred to the B light-receiving unit is transferred to a G CCD transfer unit 403 (state E). In this case, since the B light-receiving unit stores a charge $\Delta E_{B1}$ during the charge transfer time $\Delta T_1$ from the light-receiving unit to the CCD transfer unit in the same manner as described above, the total charge amount, sigG, stored until the transfer of the charge of the G light-receiving unit to the G CCD transfer unit is completed is given by:

$$sigG = E_G + \Delta E_{B2} + \Delta E_{B1} \quad (2)$$

The amount of the B signal mixed in the G signal $E_G$ is $\Delta E_{B2} + \Delta E_{B1}$.

Since the same description as B applies to the R light-receiving unit from the arrangement shown in FIG. 4, from equation (1), the total charge amount, sigR, of the R light-receiving unit is given by:

$$sigR = E_R + \Delta E_{R1} \quad (3)$$

The charges given by equations (1), (2), and (3) sequentially move in the CCD transfer units, and are output to circuits shown in FIG. 5. The operation of this embodiment will be described below with reference to FIG. 5.

The charges (to be referred to as analog image signals hereinafter) output from the CCD transfer units are amplified to a predetermined level by amplifier circuits (not shown), and are sampled/held by sample/hold (S/H) circuits 101, 102, and 103. The outputs from the S/H circuits 101, 102, and 103 are converted into digital signals by A/D converters 104, 105, and 106.

Let Rn (=sigR), Gn (=sigG), and Bn (=sigB) respectively be R, G, and B reading signals, which are output from the A/D converters 104, 105, and 106 and correspond to an n-th scan line of the line sensor. Then, Bn is multiplied with a color mixing correction coefficient C0 (to be described later) by a multiplier 108, and an adder 109 subtracts C0·Bn from Gn, thus obtaining G'n. That is, $$G'n = Gn - C0 \cdot Bn \quad (4)$$

The above-mentioned signals Rn, G'n, and Bn are also obtained upon reading of a standard white level prior to reading of an original image (these reading signals will be referred to as shading data hereinafter). The shading data are stored in a shading data memory 113 comprising R, G, and B RAMs 110, 111, and 112.

Upon reading of an original image, R, G, and B image signals are subjected to shading correction by shading correction circuits 114, 115, and 116 (i.e., a shading correction circuit 117) as in a conventional image reading apparatus.

The determination of the color mixing correction coefficient C0 will be explained below with reference to FIG. 6 again.

In FIG. 6, let T be the time required for the B light-receiving unit 402 to store the charge $E_B$ for one pixel (the B light-receiving unit obtains the charge $E_B$ for the storage time T). In state C in FIG. 6, since the light-receiving unit requires the time $\Delta T_1$ for transferring the charge to the CCD transfer unit, the charge amount, $\Delta E_{B1}$, stored in the B light-receiving unit during the time $\Delta T1$ is:

$$\Delta E_{B1} = \Delta T_1 \cdot E_B / T \quad (5)$$

Therefore, from equation (1), the total charge amount sigB upon completion of the transfer of the charge stored in the B light-receiving unit is given by:

$$sigB = E_B + \Delta T_1 \cdot E_B / T = (1 + \Delta T_1/T) E_B \quad (6)$$

The same applies to the R light-receiving unit, and from equation (3), the total charge amount sigR is given by:

$$sigR = E_R + \Delta T_1 \cdot E_R / T = (1 + T_1/T) E_R \quad (7)$$

As for the G light-receiving unit, as shown in state D in FIG. 6, since the transfer time of the charge $E_G$ of the G light-receiving unit to the B light-receiving unit is $\Delta T_2$, the charge amount $\Delta E_{B2}$ mixed in the charge $E_G$ from the B light-receiving unit during the time $\Delta T_2$ is:

$$\Delta E_{B2} = \Delta T_2 \cdot E_B / T \quad (8)$$

Furthermore, since the charge $\Delta E_{b1}$ stored (mixed) upon transfer of the charge of the B light-receiving unit to the G CCD transfer unit 403 is $\Delta T_1 \cdot E_B / T$ from equation (5), the total charge amount sigG stored until the transfer of the charge of the G light-receiving unit to the G CCD transfer unit is completed is given, from equation (2), by:

$$sigG = E_G + \Delta T_2 \cdot E_B/T + \Delta T_1 \cdot E_B/T = E_G + (\Delta T_2 + \Delta T_1) E_B/T \quad (9)$$

Consequently, the charge amount of the B light-receiving unit mixed in the charge $E_G$ is $(\Delta T_2 + \Delta T_1) E_B/T$, and if this amount is assumed to be C times the total charge amount sigB of the B light-receiving unit, from equation (6), we have:

$$(\Delta T_2 + \Delta T_1) E_B/T = C \cdot sigB = C \cdot (T + \Delta T_1) E_B/T$$

and $$C = (\Delta T_2 + \Delta T_1)/(T + \Delta T_1) \quad (10)$$

and the stored charge amount $E_G$ of the G light-receiving unit is obtained by subtracting the product of the B total charge amount sigB and C from the G total charge amount sigG. That is, $$E_G = sigG - C \cdot sigB \quad (11)$$

In FIG. 5, since the B signal Bn is multiplied with C0 by the multiplier 108, and the product is added by the adder 109, if the coefficient C0 is represented by —C, C0 is given by:

$$C0 = -(\Delta T_2 + \Delta T_1)/(T + \Delta T_1) \quad (12)$$

As described above, the signal from the G light-receiving unit is subjected to shading correction after subtraction of the signal from the B light-receiving unit weighted with the correction coefficient C0 from the G signal is performed for shading data and image reading data, thus realizing color mixing correction.

Note that the charges $\Delta E_{B1}$ and $\Delta E_{R1}$ are also stored in the B and R light-receiving units upon charge transfer. However, since the charges of the same colors are stored upon reading of shading data, these charges do not influence shading-corrected signals. Therefore, as can be seen from the above description, the correction circuit need only be prepared for the G light-receiving unit (a color for which a charge is transferred via a light-receiving unit of another color).

Second Embodiment

In the first embodiment, the charge amount ($\Delta E_{B2} + \Delta E_{B1}$) of the B light-receiving unit mixed in the charge $E_G$ stored in the G light-receiving unit is determined based on the storage time ratio ($\Delta T_2 + \Delta T_1$)/T of the charge $E_B$ stored in the B light-receiving unit from equation (9). However, in practice, since charge transfer is performed in a finite time $\Delta T$ at the boundary between the sampling periods of two pixels, strictly speaking, the mixed charge amount stored at this time is determined by the charge amount of the two pixels sandwiching the charge transfer time therebetween.

This determination method will be explained below with reference to FIGS. 7 and 8.

Figure 7:
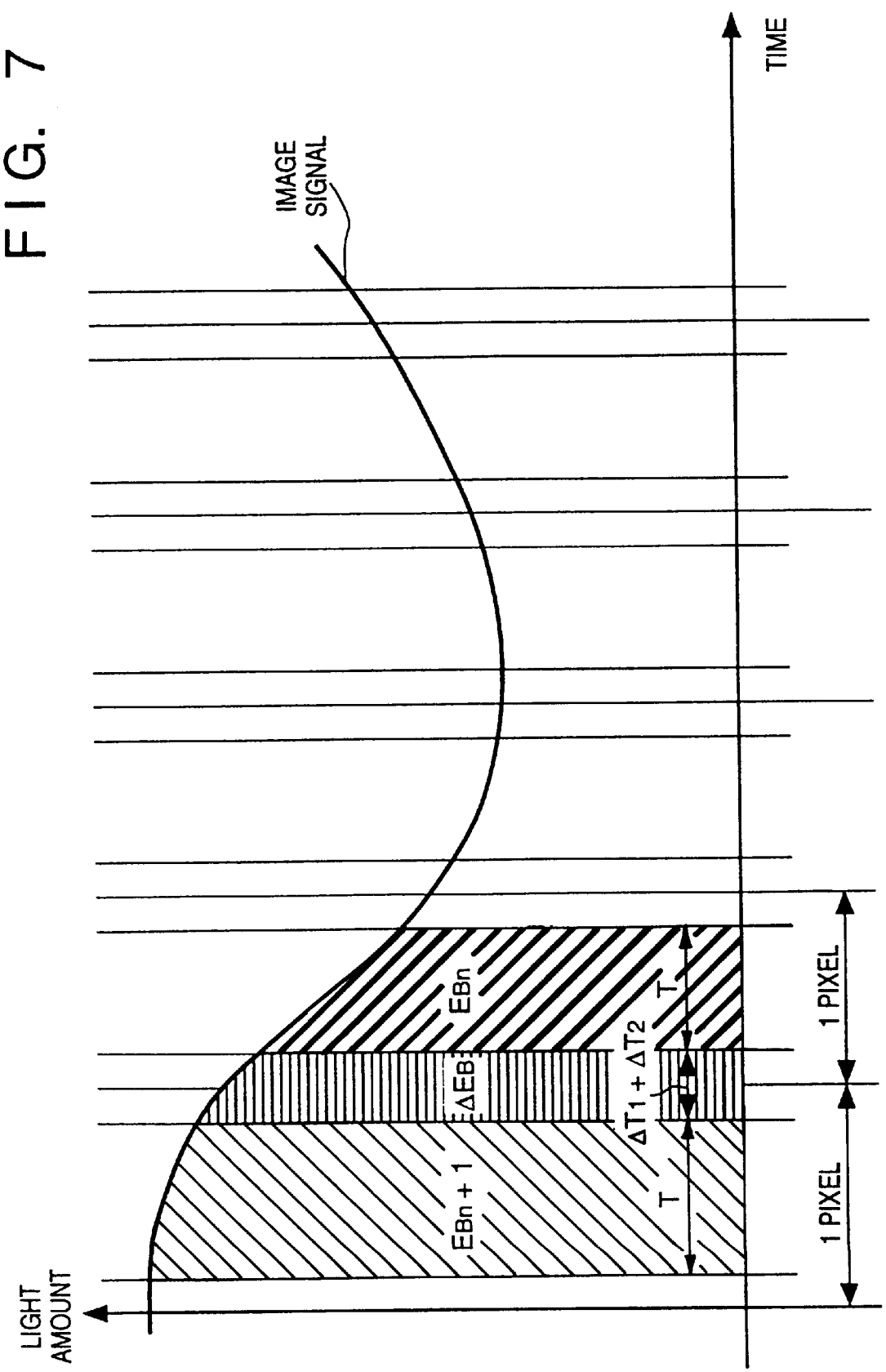
FIG. 7 is a view for explaining an image reading operation according to the second embodiment of the present invention.

FIG. 7 shows the time change in incident light amount when the B light-receiving unit reads an original image. In FIG. 7, time is plotted along the abscissa, and the incident light amount is plotted along the ordinate. In FIG. 7, the incident light amount changes in correspondence with the reflectance of an original image, as indicated by a curve shown in FIG. 7, and the stored charge amount is proportional to the product (the hatched area in FIG. 7) of the incident light amount and the storage time.

Assuming that the sampling interval of an image is a period indicated by "←1 pixel→" in FIG. 7, charge transfer is performed during a finite time having the switching timing of the sampling periods as the center. In particular, the charge of the B light-receiving unit, which is mixed in the G light-receiving unit, is stored during the transfer time ($\Delta T_2$) from the G light-receiving unit to the B-light receiving unit and the transfer time ($\Delta T_1$) from the B light-receiving unit to the G CCD transfer unit, as shown in FIG. 6.

At this time, the stored charge amount is expressed by a hatched portion $\Delta E_B$ in FIG. 7. Since this charge amount is stored during the time $\Delta T_2$ and then during the time $\Delta T_1$, the stored charge amount during the time $\Delta T_2$ can be approximated by a charge $E_{Bn}$, and the charge amount during the time $\Delta T_1$ can be approximated by a charge $E_{Bn+1}$ of the next pixel.

More specifically, equation (9) can be rewritten as:

$$sigG = E_G + \Delta T_2 \cdot E_{Bn}/T + \Delta T_1 \cdot E_{Bn+1}/T \quad (13)$$

Using sigBn and sigBn+1 of equation (6), the mixed charge amount (the second and third terms of the right-hand side of equation (13)) is given by:

$$\Delta T_2 \cdot E_{Bn}/T + \Delta T_1 \cdot E_{Bn+1}/T = \Delta T_2 \cdot T \cdot sigBn/T \cdot (T + \Delta T_1) + \Delta T_1 \cdot T \cdot sigBn+1/T \cdot (T + \Delta T_1) = \Delta T_2 \cdot sigBn/(T + \Delta T_1) + \Delta T_1 \cdot sigBn+1/(T + \Delta T_1) \quad (14)$$

This is nothing but a sum of the product of the total charge amount sigBn of the B light-receiving portion and a correction coefficient C1:

$$C1 = -\Delta T_2/(T + \Delta T_1) \quad (15)$$

and the product of the total charge amount sigBn+1 of the next pixel of the B light-receiving unit and a correction coefficient C2:

$$C2 = -\Delta T_1/(T + \Delta T_1) \quad (16)$$

Figure 8:
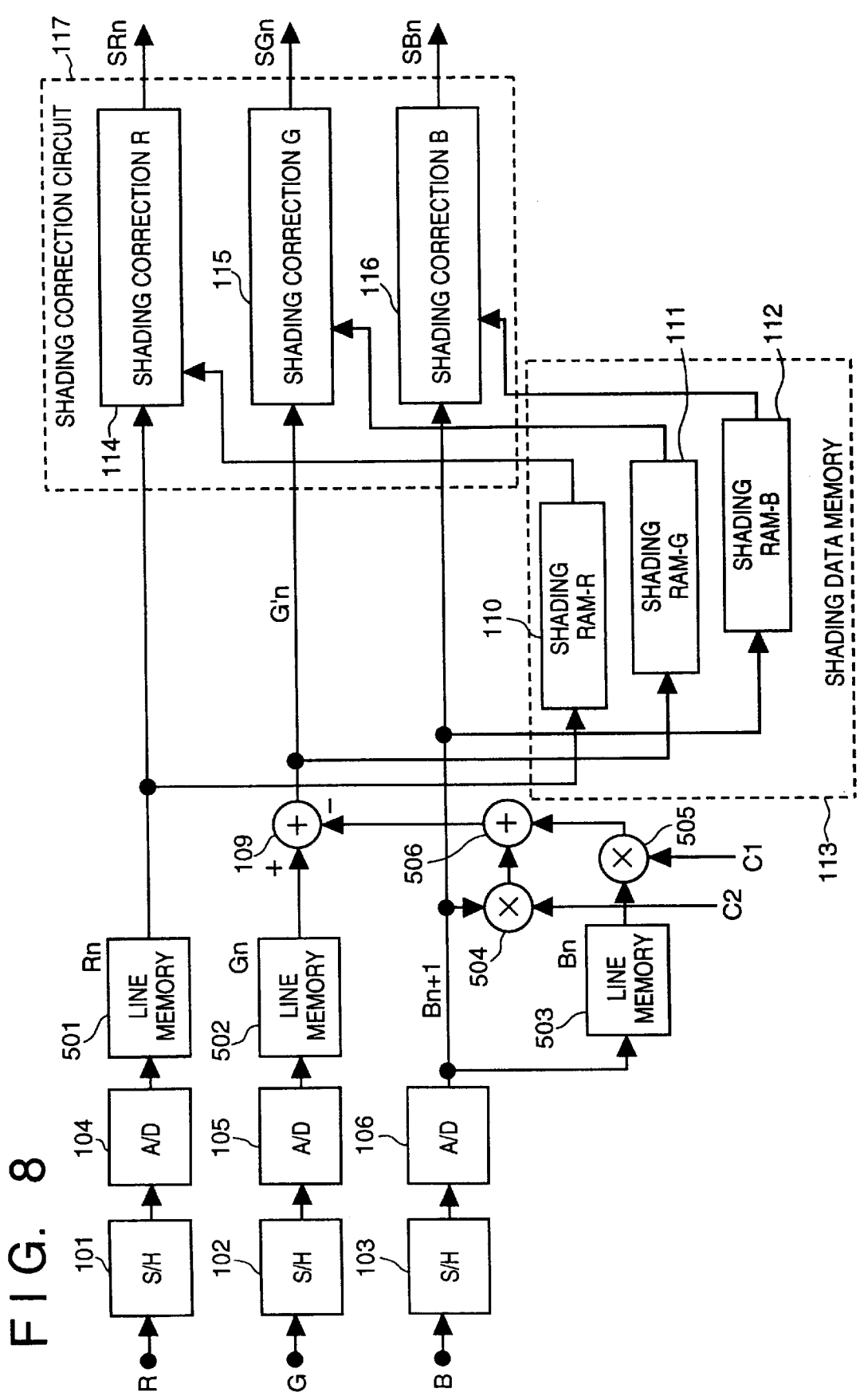
FIG. 8 is a view showing the arrangement of an image reading apparatus according to the second embodiment of the present invention.

FIG. 8 shows the circuit arrangement for realizing this. In FIG. 8, line memories 501, 502, and 503 are used for attaining synchronization when the correction term as a sum of the image signal delayed by one line and the image signal of the line of interest of the B light-receiving unit is subtracted from the image signal of the G light-receiving unit. Of these line memories, the R line memory 501 is not particularly required here if it is realized by post-processing (not shown).

An image signal Bn delayed by one line by the line memory 503 and the image signal Bn+1 of the next line are respectively multiplied with the correction coefficients C1 and C2 given by equations (15) and (16) by multipliers 504 and 505, and the products are added to each other by an adder 506. This correction term (given by equation (14)) is added to an image signal Gn delayed by one line by the adder 109 to obtain G'n.

Third Embodiment

In the first and second embodiments, the R, G, and B light-receiving units are arranged adjacent to each other, as shown in FIG. 4. However, even when the light-receiving units are separated from each other, as shown in FIG. 3, color mixing can be corrected by the same correction method by increasing the number of line memories 501, 502, and 503 as required, and synchronizing the read image positions of colors whose charges are transferred via other charges and colors via which other charges are transferred.

As described above, according to this embodiment, the product of image data of the light-receiving unit of a given color via which a stored charge is transferred, and a correction coefficient is subtracted from image data, which is obtained by transferring a stored charge to the CCD transfer unit via the light-receiving unit of the given color, thereby correcting color mixing caused by transferring stored charges via another color pixel.

Fourth Embodiment

The fourth embodiment of the present invention will be described below. In this embodiment, the present invention is applied to an image processing apparatus. However, the present invention is not limited to this, but may be applied to an image reader of, e.g., a copying machine.

As a CCD linear image sensor used in the image processing apparatus of this embodiment, the sensor shown in FIG. 3 above can be used. Referring to FIG. 3, reference numeral 301 denotes an R light-receiving unit having an R color filter; 302, a G light-receiving unit having a G color filter; 303, a B light-receiving unit having a B color filter; 304 and 305, ODD- and EVEN-pixel CCD transfer units for reading out charges stored in the R light-receiving unit; 306 and 307, ODD- and EVEN-pixel CCD transfer units for reading out charges stored in the G light-receiving unit; 308 and 309, ODD- and EVEN-pixel CCD transfer units for reading out charges stored in the B light-receiving unit; and 310 to 315, amplifiers for converting transferred charges into voltage signals, and outputting the voltage signals. Since the CCD transfer units of this CCD linear image sensor are not arranged between adjacent ones of the R, G, and B light-receiving units, the R-G and G-B intervals shown in FIG. 3 can be decreased. Since charges stored in the R and B light-receiving units can be transferred (shifted) to the corresponding CCD transfer units without going through any light-receiving units of other colors, no color mixing occurs. However, since a charge stored in the G light-receiving unit must be transferred (shifted) to the corresponding CCD transfer units via the B light-receiving unit, a charge generated by the B light-receiving unit is added to this charge, thus causing color mixing (B→G color mixing in this case).

In this embodiment, when the CCD linear image sensor shown in FIG. 3 is used, a standard original (an original with a given density) is read in modes A and B shown in FIGS. 9A, 9B, 9C and 9D, and the B→G color mixing amount is calculated based on the reading signal obtained in these modes. Then, a color mixing correction coefficient is calculated from the calculated color mixing amount, thereby correcting color mixing. As shown in FIGS. 9A and 9B, in the mode A, the light-receiving/charge storage period of the light-receiving unit (to be referred to as a "light-receiving/storage period" hereinafter) and the charge read-out time of the CCD transfer unit are respectively set to be a time T. As shown in FIGS. 9C and 9D, in the mode B, the light-receiving/storage period and the charge read-out time are set to be twice (2T) the time in the mode A. On the other hand, the charge transfer (shift) time from the light-receiving unit to the CCD transfer unit is set to be a time ΔT in both the modes A and B. Therefore, signals G obtained in the modes A and B include the following signal components:

$$G_{Aj} = g_{Aj} + K_j \quad (17)$$

$$G_{Bj} = g_{Bj} + K_j \quad (18)$$

where $G_{Aj}$: a signal G obtained in the mode A $G_{Bj}$: a signal G obtained in the mode B $g_{Aj}$: a signal obtained by removing the color mixing component from $G_{Aj}$ $g_{Bj}$: a signal obtained by removing the color mixing component from $G_{Bj}$ $K_j$: the color mixing amount from B to G j: the pixel number From the relationship of the light-receiving/storage periods, $g_{Aj}$ and $g_{Bj}$ hold an equation below:

$$g_{Bj} = 2 \times g_{Aj} \quad (19)$$

Therefore, from equations (17) to (19), an equation below is obtained:

$$K_j = 2 \cdot G_{Aj} - G_{Bj} \quad (20)$$

Figure 10:
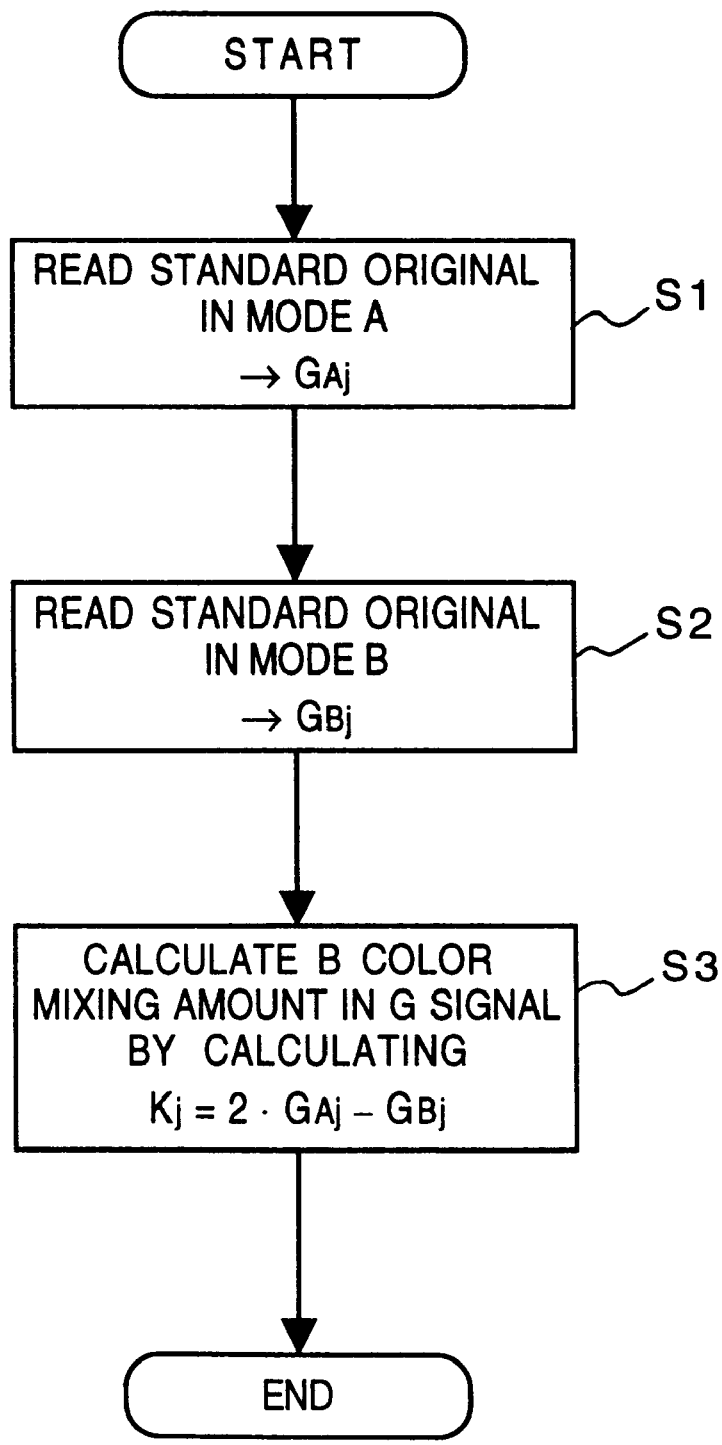
FIG. 10 is a flow chart showing the processing executed when a color mixing amount $K_j$ is obtained in the image reading modes shown in FIG. 9.

FIG. 10 is a flow chart showing the processing when this color mixing amount $K_j$ is obtained. In step S1, a standard original is read in the mode A. In step S2, the same standard original is read in the mode B. Thereafter, the calculation of equation (20) is made in step S3 to obtain the color mixing amount $K_j$. The above-mentioned processing can be executed before an actual image reading operation. By matching parameters in the normal reading operation with those in the mode A, a B→G color mixing ratio $\alpha_j$ is obtained by an equation below. Based on this color mixing ratio $\alpha_j$, color mixing correction is performed in the actual original reading operation.

$$\alpha_j = K_j / B_{Aj} \quad (21)$$

where $B_{Aj}$: a signal B obtained in the mode A

Figure 11:
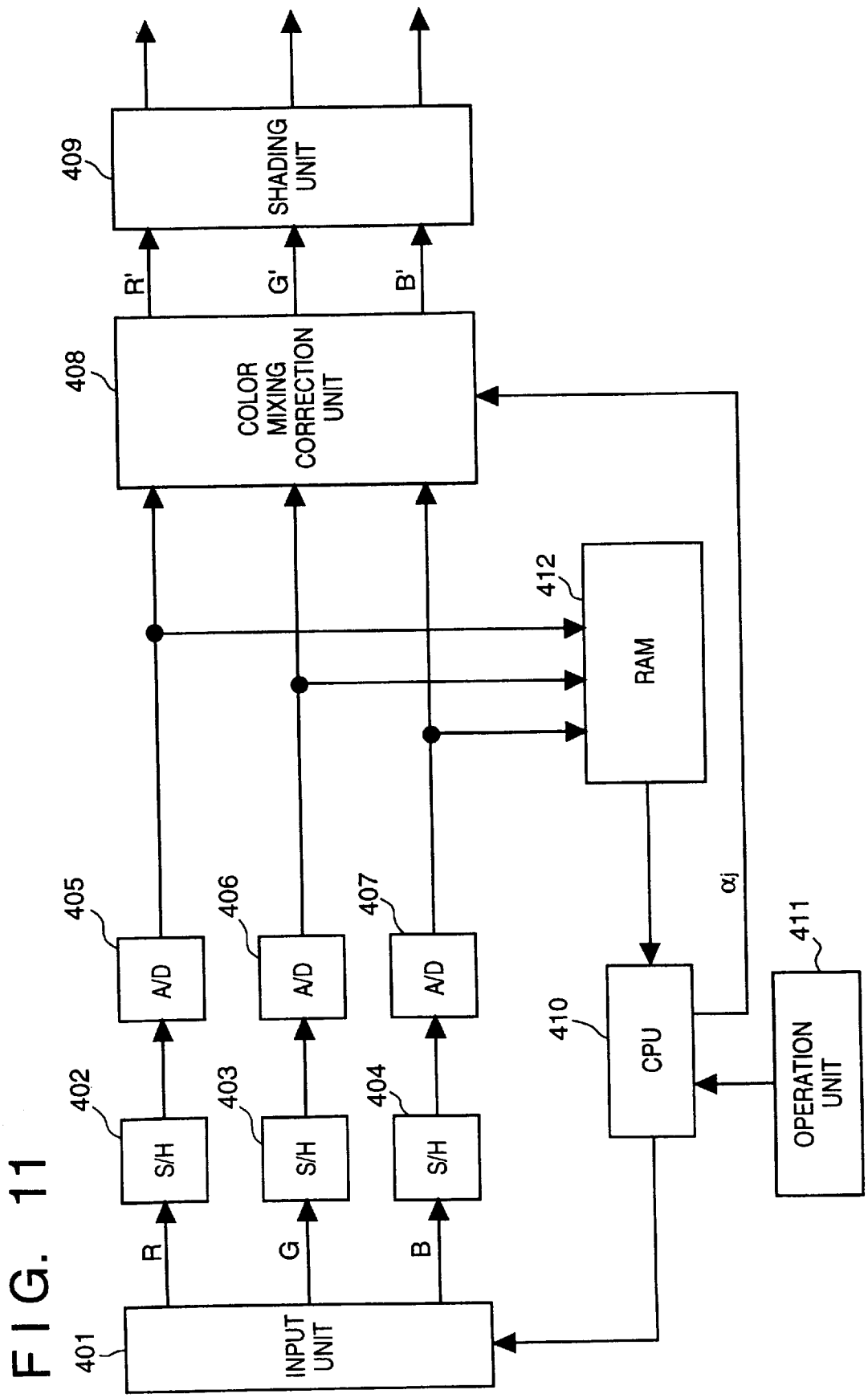
FIG. 11 is a block diagram showing the arrangement of principal part according to the embodiment of the present invention.

FIG. 11 is a block diagram showing principal part according to the present invention in this embodiment.

Figure 2:
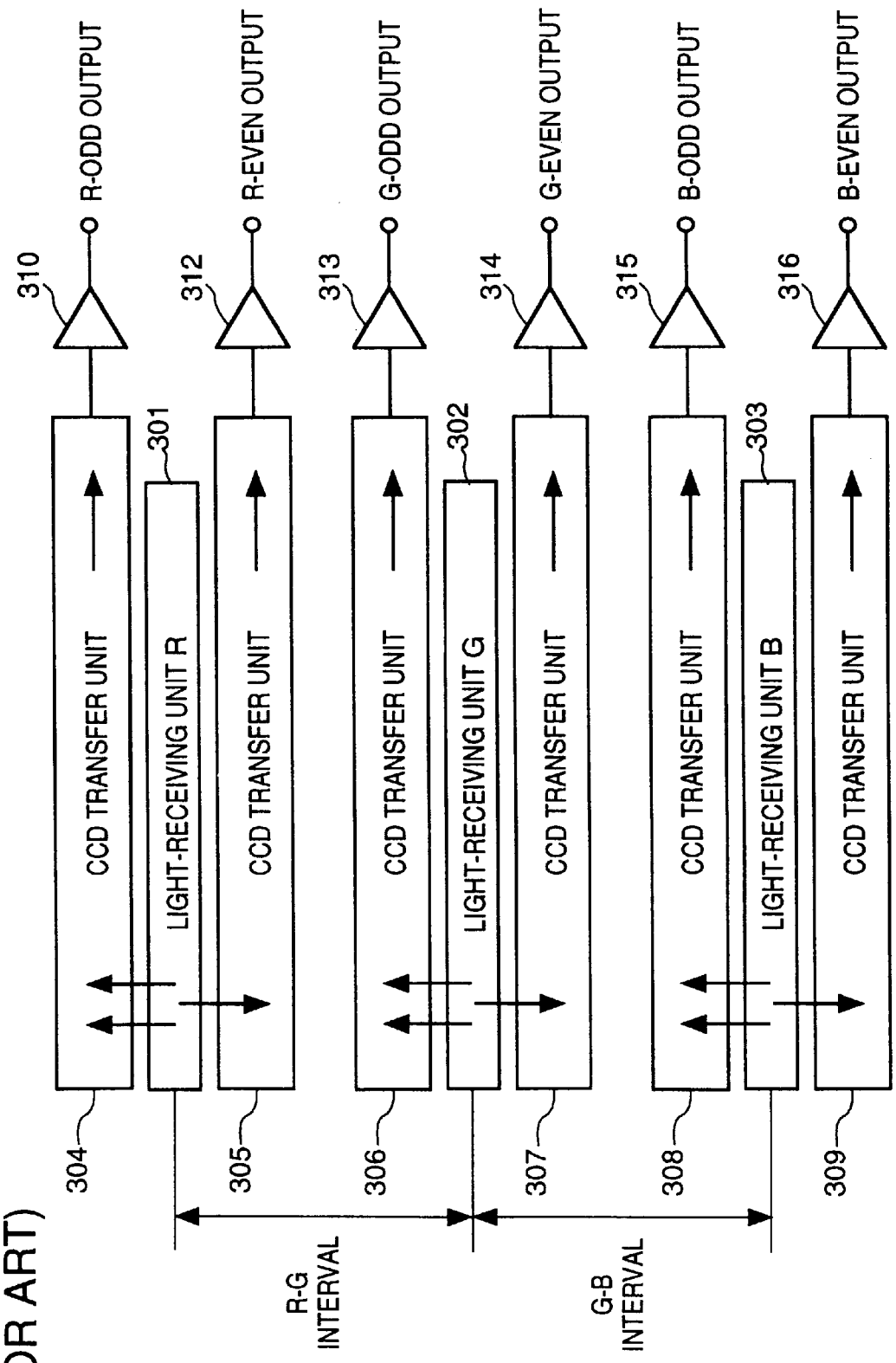
FIG. 2 is a view showing the arrangement of a CCD linear image sensor of the conventional color image reading apparatus.

Referring to FIG. 11, reference numeral 401 denotes an input unit comprising the CCD linear image sensor shown in FIG. 3. The input unit 401 separates light reflected by an original into three, i.e., R, G, and B, color components, and outputs electrical signals corresponding to these color components. R, G, and B analog signals output from the input unit 401 are sampled and held by S/H circuits 402, 403, and 404, and are then A/D-converted by A/D converters 405, 406, and 407 to obtain 8-bit R, G, and B digital signals. When a conventional CCD linear image sensor shown in FIG. 2 is used, for example, A/D-converted signals R and G must be delayed by predetermined periods of time using delay memories so as to correct CCD spatial shifts of the R, G, and B signals. However, this embodiment does not require such processing since almost no spatial shift of the CCD occurs. Reference numeral 408 denotes a color mixing correction unit unique to this embodiment, which unit performs the above-mentioned color mixing correction to the A/D-converted signals. The arrangement of the unit 408 will be described later. Reference numeral 409 denotes a shading unit for performing correction to the signals subjected to color mixing correction in accordance with the shading characteristics of the input unit 401.

Reference numeral 410 denotes a CPU comprising, e.g., a one-chip microcomputer. The CPU 410 controls the operation of the entire apparatus of this embodiment on the basis of programs stored in its internal ROM. Also, the CPU 410 executes processing for calculating the color mixing ratio $a_j$ given by equation (21) using data in the respective modes stored in a RAM 412. Reference numeral 411 denotes an operation unit comprising an input section which consists of a keyboard, a touch panel, and the like, and can designate the above-mentioned test mode, and a display section consisting of an LCD, indicators, and the like. The operation unit 411 supplies an operators instruction to the CPU 410, and displays information from the CPU 410, e.g., the operation state and the operation condition of the apparatus of this embodiment.

Figure 12:
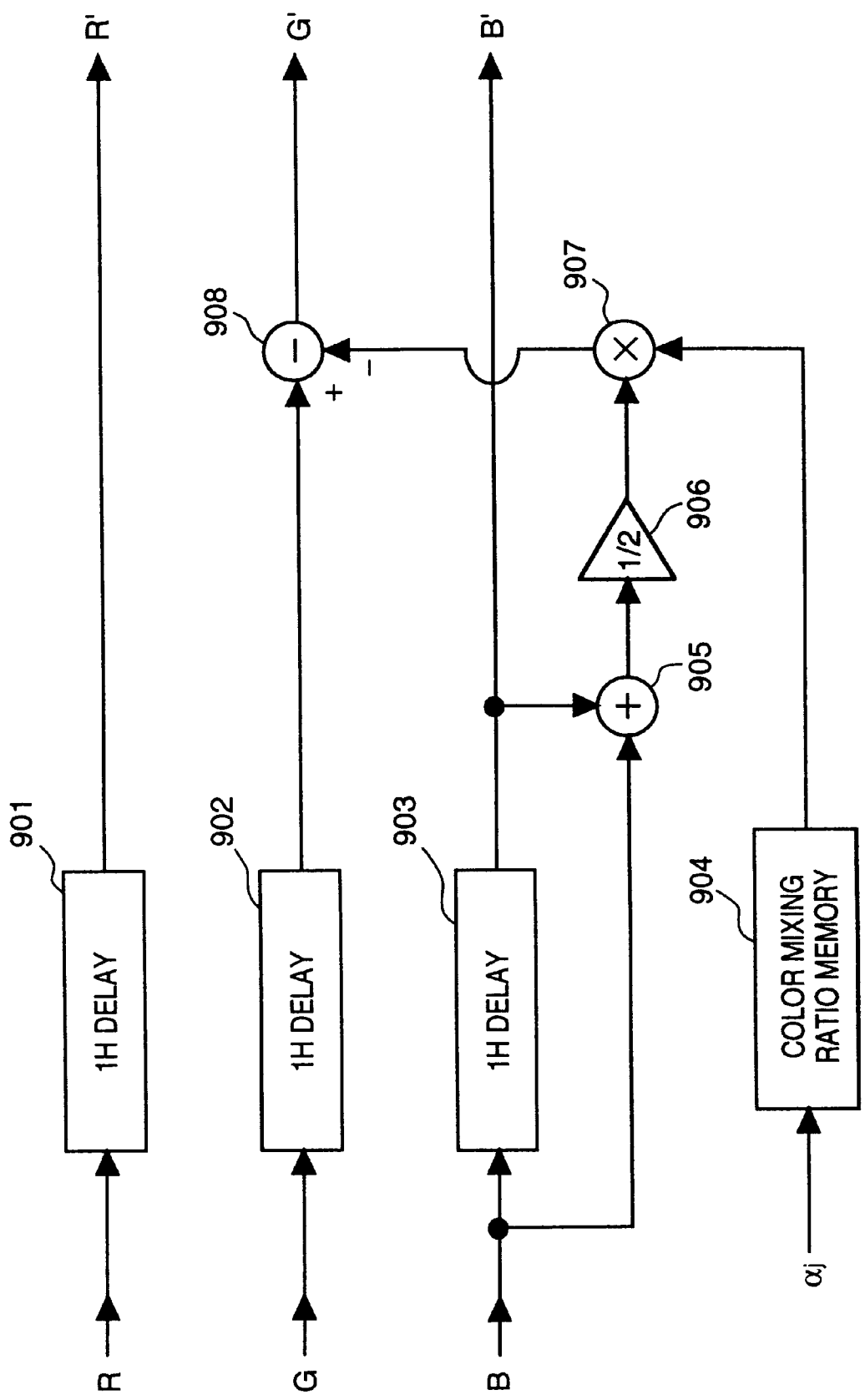
FIG. 12 is a block diagram showing the arrangement of a color mixing correction unit.

FIG. 12 is a block diagram showing the arrangement of the color mixing correction unit 408.

Referring to FIG. 12, reference numerals 901 to 903 denote delay circuits for respectively delaying R, G, and B image signals by 1H (1 line). Reference numeral 904 denotes a color mixing ratio memory for sequentially outputting the B→G color mixing ratios $\alpha_j$ stored by the CPU 410 as the color mixing correction coefficients $\alpha_j$ corresponding to pixels in synchronism with the image signals. Note that a part of the RAM 412 or the entire RAM 412 may be used as the color mixing ratio memory 904 for storing the color mixing ratios $\alpha_j$ and pixels in correspondence with each other.

Reference numeral 905 denotes an adder for adding a signal B input to the 1H delay circuit 903 to a signal B output from the delay circuit 903. Reference numeral 906 denotes a divider for dividing the output from the adder 905 by 2. Reference numeral 907 denotes a multiplier which multiplies the output, $B_{Aj}$, from the divider 906 with the color mixing correction coefficient $\alpha_j$ output from the color mixing ratio memory 904, and outputs the B→G color mixing amount $K_j$. Reference numeral 908 denotes a subtracter which subtracts the output (B→G color mixing amount $K_j$) from the multiplier 907 from a signal $G_{Aj}$ delayed by the 1H delay circuit 902, and outputs a signal $G'(g_{Aj})$ subjected to color mixing correction.

Note that the average value of the signals B before and after the 1H delay circuit 903 is used so as to interpolate B→G color mixing between an n-th line signal B and the next (n+1)-th line signal B since the B→G color mixing occurs not in the charge storage operation but in the charge transfer (shift) operation. This interpolation allows accurate detection of the color mixing amount $K_j$, thus attaining color mixing correction with high precision.

Figure 1:
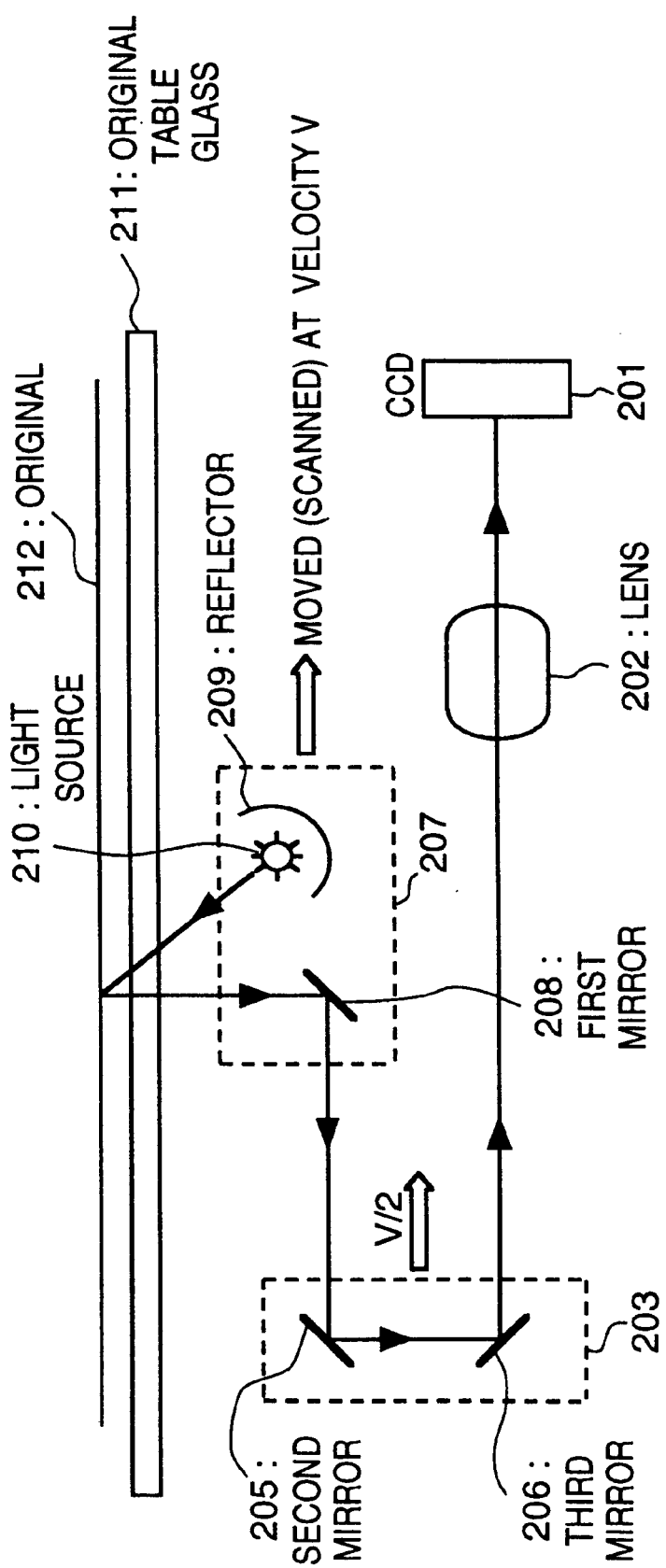
FIG. 1 is a view for explaining the optical system of a conventional color image reading apparatus.
Figure 13:
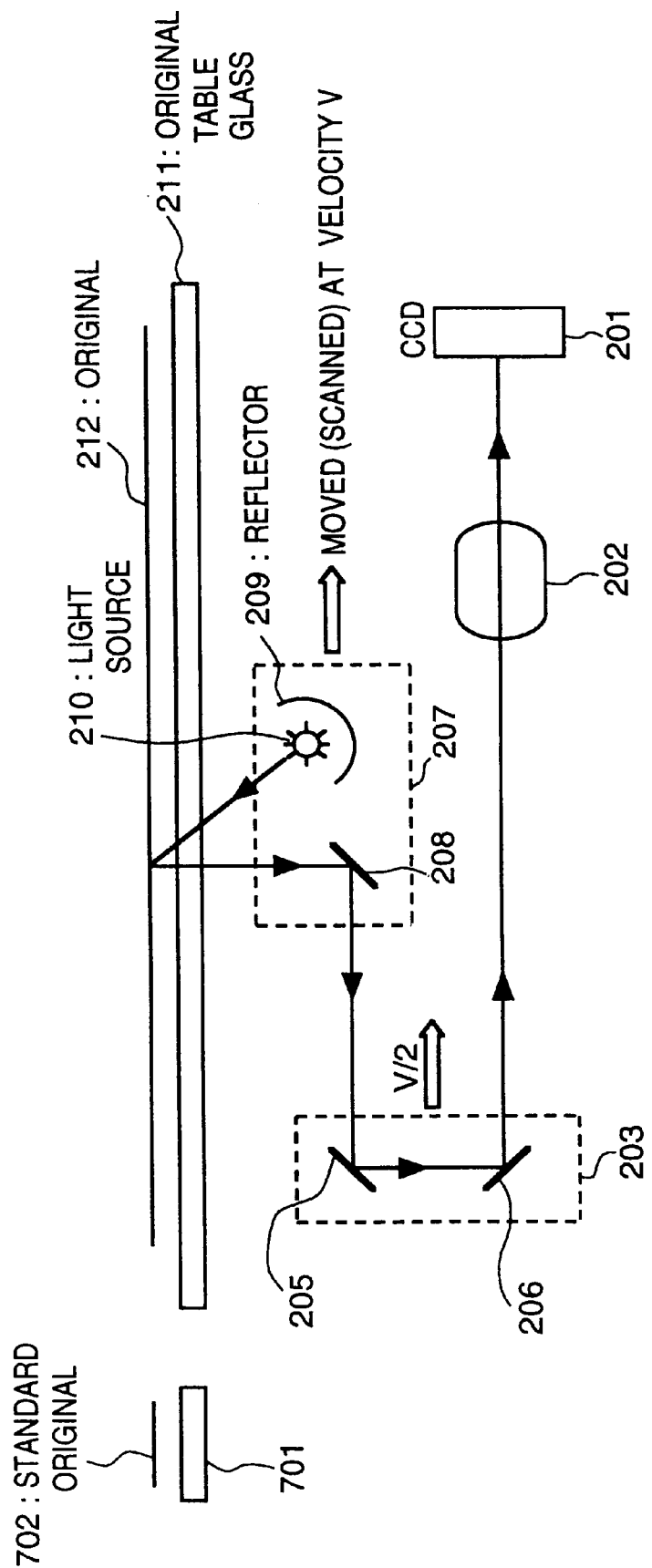
FIG. 13 is a view showing the arrangement of an image reading apparatus according to the embodiment of the present invention.

FIG. 13 is a view showing the arrangement of the image reading apparatus of this embodiment. The arrangement shown in FIG. 13 is substantially the same as that shown in FIG. 1, except that a standard original 702 is placed on a standard original reader 701. The color mixing ratio $\alpha_j$ and the color mixing amount $K_j$ can be measured by reading this standard original 701 in the modes A and B shown in FIG. 9. Note that the measurement of $K_j$ and $\alpha_j$ may be performed every image reading operation, or may be performed at predetermined intervals set by the operation unit 411 or when a special instruction is input from the operation unit 411. When the standard original 702 is placed on the standard original reader 701, the environment upon detection of the color mixing amount $K_j$ can be maintained constant, and an accurate color mixing amount $K_j$ can always be detected.

Fifth Embodiment

The method of obtaining the color mixing amount $K_j$ is not limited to that shown in FIGS. 9A–9D and 10. FIGS. 14A–14D and 15 show another method of obtaining the color mixing amount $K_j$.

As shown in FIGS. 14A and 14B, the charge transfer period in the mode A (normal image reading mode) is set to be a time $\Delta T$, while in the mode C, illustrated in FIGS. 14C and 14D, the charge transfer period is set to be twice ($2 \cdot \Delta T$) that in the mode A. On the other hand, the same light-receiving/storage period is set in both the modes A and C. Therefore, signals G obtained in the modes A and C include the following components:

$$G_{Aj} = g_{Aj} + K_j \quad (22)$$

$$G_{Cj} = g_{Cj} + 2 \cdot K_j \quad (23)$$

where $G_{Cj}$: a signal G obtained in the mode C

Since equation (24) below holds, the color mixing amount $K_j$ is given by equation (25):

$$g_{Aj} = g_{Cj} \quad (24)$$

$$K_j = G_{Cj} - G_{Aj} \quad (25)$$

Figure 15:
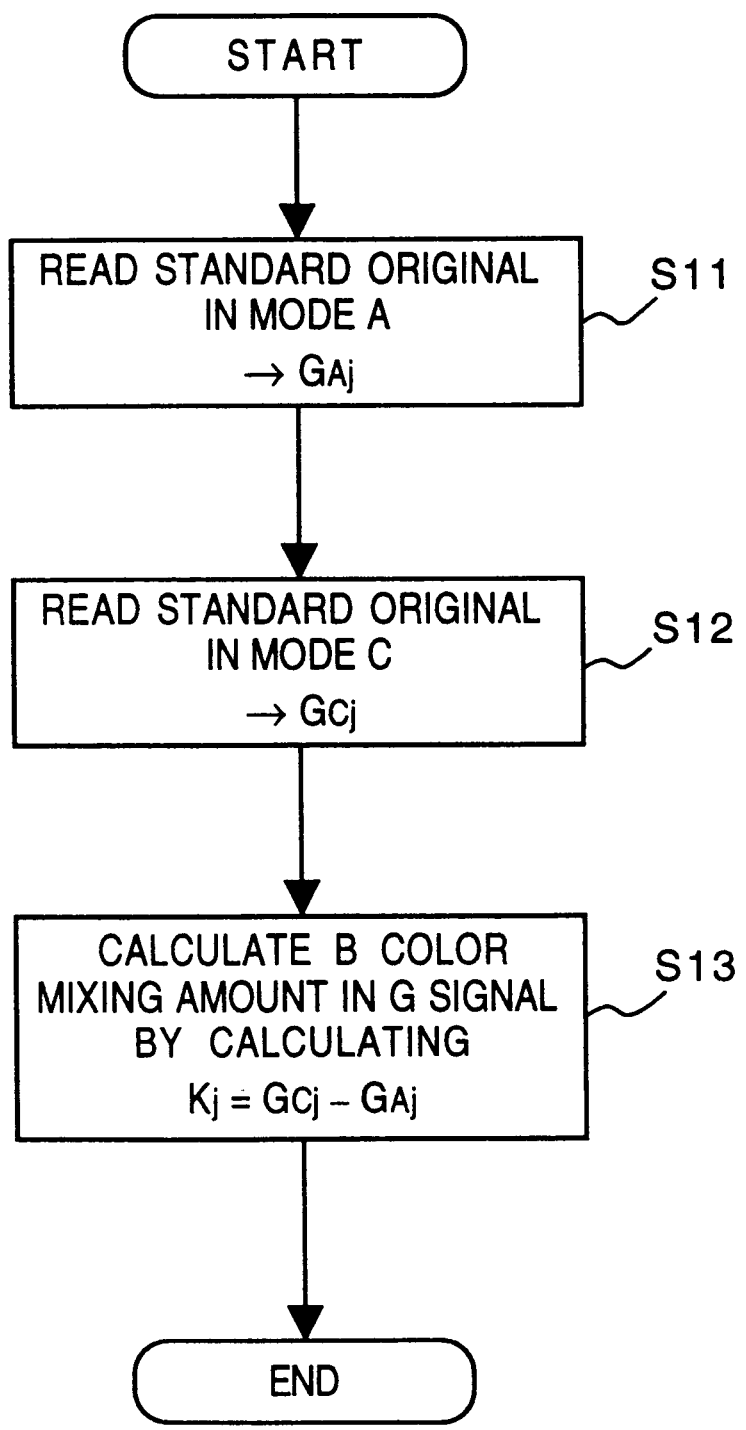
FIG. 15 is a flow chart showing the processing executed when a color mixing amount $K_j$ is obtained in the image reading modes shown in FIG. 14.

FIG. 15 is a flow chart showing the processing when the color mixing amount $K_j$ is obtained. In step S11, a standard original is read in the mode A. In step S12, the standard original is read in the mode C. Thereafter, equation (25) is calculated in step S13 to obtain the color mixing amount $K_j$. In this manner, the calculation of the color mixing ratio $\alpha_j$ and color mixing correction upon image reading can be attained by the same method and procedures as the above-mentioned method and procedures.

As described above, according to this embodiment, in the image reading apparatus using the intra-pixel transfer type CCD linear image sensor, the color mixing amount $K_j$ and the color mixing ratio $\alpha_j$ representing color mixing are obtained, and the color mixing is corrected by signal processing, thus obtaining an image free from color mixing.

Sixth Embodiment

Figure 16:
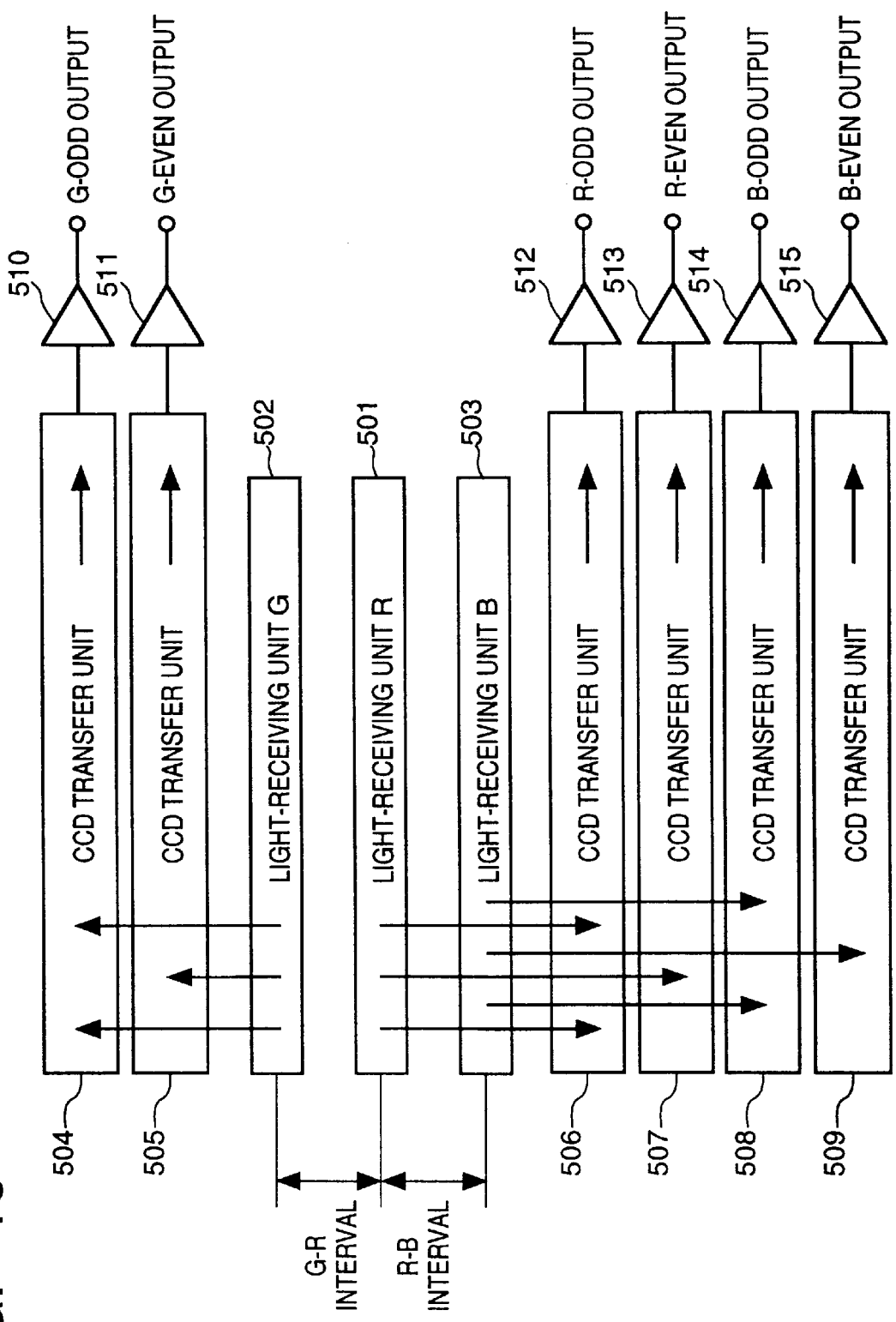
FIG. 16 is a block diagram showing another arrangement of a CCD linear image sensor.

The arrangement of the CCD linear image sensor is not limited to that shown in FIG. 3. FIG. 16 is a block diagram showing another arrangement of the sensor. The difference in the sensor shown in FIG. 16 from that shown in FIG. 3 is that a charge of an R light-receiving unit 501 is transferred via a B light-receiving unit 503, and a charge of a G light-receiving unit 502 is transferred without going through any other light-receiving units.

More specifically, the present invention is not limited to any specific disposition order or intra-pixel transfer order of the R, G, and B light-receiving units.

Figure 17:
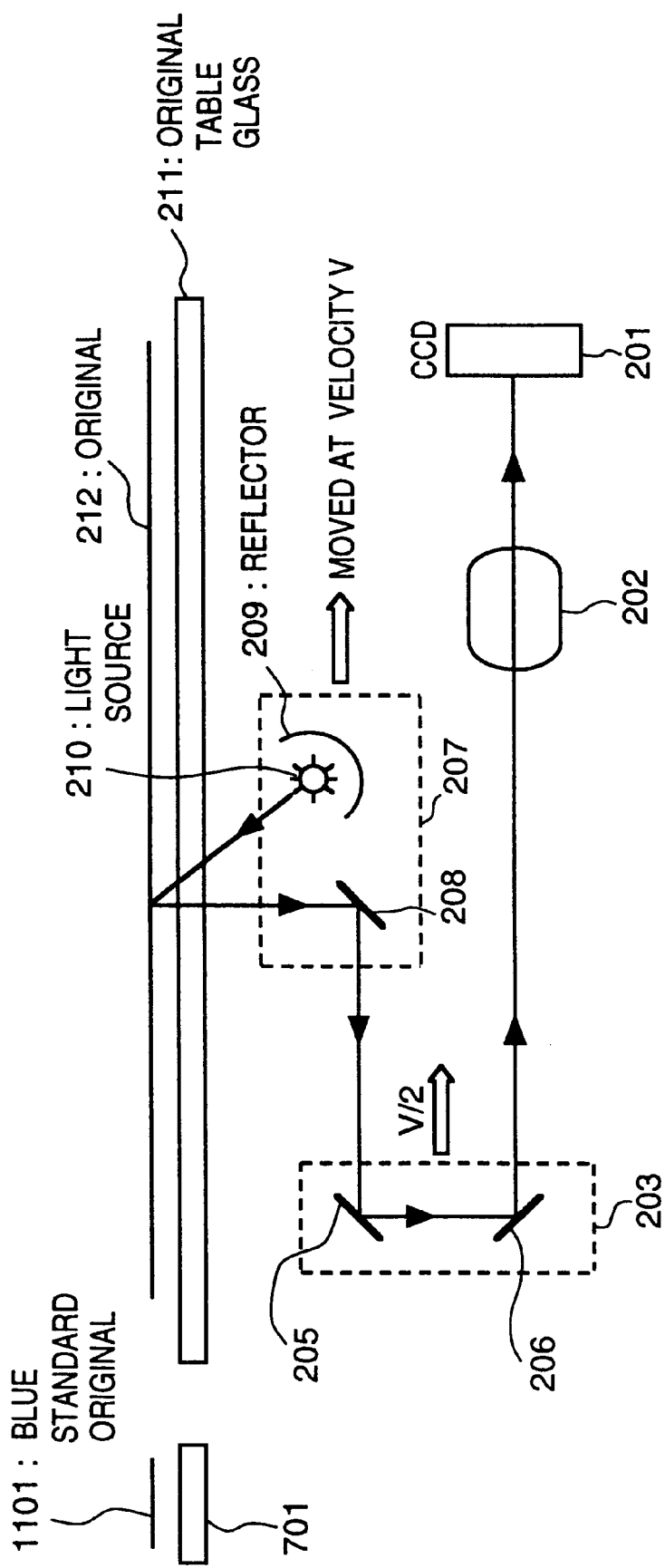
FIG. 17 is a view showing the arrangement of an image reading apparatus using the CCD linear image sensor shown in FIG. 16.

FIG. 17 shows the arrangement of an image reading apparatus using the CCD linear image sensor shown in FIG. 16. The difference in the arrangement shown in FIG. 18 from that shown in FIG. 13 is that a blue standard original 1101 is placed as a standard original with a given density on the standard original reader 701. In FIG. 17, when the blue standard original 1101 is read by the CCD 201, almost no charges are generated by the R light-receiving unit 501. However, since charges are transferred to the CCD transfer units 506 and 507 via the B light-receiving unit 503, B→R color mixing occurs. Therefore, from signals $R_j$, $G_j$ and $B_j$ (j is the pixel number) obtained when the blue standard original by the CCD 201, the color mixing ratio $\alpha_j$ is given by:

$$\alpha_j = R_j / B_j \quad (26)$$

As described above, when the blue standard original 1101 is used, two modes need not be prepared, and the color mixing ratio $\alpha_j$ can be obtained by a simple arrangement and calculations. Although a detailed description will be omitted, color mixing correction upon image reading can be attained by the same method and procedures as the above-mentioned method and procedures.

Furthermore, this embodiment can be applied to all image processing apparatuses which use intra-pixel transfer type CCD linear image sensors, which transfer a charge of a light-receiving unit of a given color (first color component) via the second light-receiving unit.

In the above embodiments, the color mixing ratio $\alpha_j$ is calculated in units of pixel numbers j. However, the present invention is not limited to this. For example, only one color mixing ratio $a_j$ may be obtained based on the average of all the pixels as long as color mixing caused by intra-pixel transfer can be corrected.

The present invention may be applied to either a system constituted by a plurality of apparatuses or an apparatus consisting of a single device.

The present invention may be applied to a case wherein the invention is attained by supplying a program to the system or apparatus.

The present invention is not limited to the above embodiments and various changes and modifications can be made within the spirit and scope of the present invention. Therefore, to apprise the public of the scope of the present invention the following claims are made.

What is claimed is:

1. An image pickup apparatus for reading a color image by irradiating light onto an object, and photoelectrically converting light from the object, comprising:

a linear image sensor which comprises a plurality of light-receiving portions corresponding to light components of a plurality of colors, and transfer units for transferring charges outward from said light-receiving portions, a charge stored in the light-receiving portion of at least one color being transferred to one of the transfer units via the light-receiving portion of another color; and calculation means, which is arranged outside of the linear image sensor, for adding a value obtained by multiplying a charge amount of said another color stored while charges of one color are transferred via the light-receiving portion of said another color with a correction coefficient to the charges of said one color transferred by the transfer units to cancel color mixing of the charge transferred via the light-receiving portion of said another color to the transfer units, wherein the correction coefficient based on the transfer time of the charge from the light-receiving portion of said another color to the transfer unit of said one color, and/or a charge storage time of said another color.

2. The apparatus according to claim 1, further comprising normalization means for normalizing with respect to standard white, and wherein a multiplication of a correction coefficient and an addition of the charge multiplied with the correction coefficient are performed prior to the normalization operation by said normalization means.

3. The apparatus according to claim 2, wherein the normalization operation by said normalization means includes a shading correction.

4. The apparatus according to claim 1, further comprising a memory for at least one line, and wherein the charge of the light-receiving portion via which the charge is transferred includes a total of charges of two pixels before and after charge transfer, and a correction coefficient includes at least two different constants respectively corresponding to the charges of the two pixels.

5. The apparatus according to claim 4, wherein correction coefficients associated with the charges of the two pixels are respectively given by $-\Delta T_2/(T+\Delta T_1)$ and $-\Delta T_1/(T+\Delta T_1)$ where $\Delta T_2$ is the time required for transferring the charge via the light-receiving portion of the other color, $\Delta T_1$ is the time required for transferring the charge from the light-receiving portion of the other color to the transfer unit, and T is the charge storage time.

6. The apparatus according to claim 1, wherein the correction coefficient is given by $-(\Delta T_2+\Delta T_1)/(T+\Delta T_1)$ where $\Delta T_2$ is the time required for transferring the charge via the light-receiving portion of the other color, $\Delta T_1$ is the time required for transferring the charge from the light-receiving portion of the other color to the transfer unit, and T is the charge storage time.

7. An image reading method for reading a color image by irradiating light onto an object, and photoelectrically converting light from the object, comprising the steps of:

preparing a linear image sensor which comprises a plurality of light-receiving portions corresponding to light components of a plurality of colors, and transfer units for transferring charges outward from said light-receiving portions, a charge stored in the light-receiving portion of at least one color being transferred to one of the transfer units via the light-receiving portion of another color; and adding a value obtained by multiplying a charge amount of said another stored while charges of one color are transferred via the light-receiving portion of said another color with a correction coefficient to the charges of said one color transferred by the transfer units, by calculation means arranged outside of the linear image sensor, to cancel color mixing of the charge of said one color transferred via the light-receiving portion of said another color to the transfer units, wherein the correction coefficient based on the transfer time of the charge from the light-receiving portion of said another color to the transfer unit of said one color, and/or a charge storage time of said another color.

8. The method according to claim 7, further comprising the step of normalization with respect to standard white, and wherein a multiplication of a correction coefficient and a addition of the charge multiplied with the correction coefficient are performed prior to the step of normalization.

9. The method according to claim 8, wherein the step of normalization includes a shading correction.

10. The method according to claim 7, further comprising the step of preparing a memory for at least one line, and wherein the charge of the light-receiving portion via which the charge is transferred includes a total of charges of two pixels before and after charge transfer, and a correction coefficient includes at least two different constants respectively corresponding to the charges of the two pixels.

11. The method according to claim 10, wherein correction coefficients associated with the charges of the two pixels are respectively given by $-\Delta T_2/(T+\Delta T_1)$ and $-\Delta T_1/(T+\Delta T_1)$ where $\Delta T_2$ is the time required for transferring the charge via the light-receiving portion of the other color, $\Delta T_1$ is the time required for transferring the charge from the light-receiving portion of the other color to the transfer unit, and T is the charge storage time.

12. The method according to claim 7, wherein the correction coefficient is given by $-(\Delta T_2+\Delta T_1)/(T+\Delta T_1)$ where $\Delta T_2$ is the time required for transferring the charge via the light-receiving portion of the other color, $\Delta T_1$ is the time required for transferring the charge from the light-receiving portion of the other color to the transfer unit, and T is the charge storage time.

* * * * *

UNITED STATES PATENT AND TRADEMARK OFFICE
CERTIFICATE OF CORRECTION

PATENT NO. : 6,078,685  
DATED : June 20, 2000  
INVENTOR(S) : Takashi Kawai et al.

Page 1 of 2

It is certified that error appears in the above-identified patent and that said Letters Patent is hereby corrected as shown below:

Column 4,  
Line 22, delete "is a view".

Column 6,  
Line 2, "C0·Bn" should read -- C0•Bn --.  
Line 5, equation (4), "G'n=Gn-C0·Bn" should read -- G'n=Gn-C0•Bn --.  
Line 28, equation (5), "$\Delta E_{B1}=\Delta T_1 \cdot E_B/T$" should read -- $\Delta E_{B1}=\Delta T_1 \bullet E_B/T$ --.  
Line 33, equation (6), "sigB=$E_B+\Delta T_1 \cdot E_B/T=(1+\Delta T_1/T)E_B$" shoud read  
-- sigB=$E_B+\Delta T_1 \bullet E_B/T=(1+\Delta T_1/T)E_B$ --.  
Line 37, equation (7), "sigR=$E_R+\Delta T_1 \cdot E_R/T=(1+T_1/T)E_R$" should read  
-- sigR=$E_R+\Delta T_1 \bullet E_R/T=(1+\Delta T_1/T)E_R$ --.  
Line 44, "equation (8), "$\Delta E_{B2}=\Delta T_2 \cdot E_B/T$" should read -- $\Delta E_{B2}=\Delta T_2 \bullet E_B/T$ --.  
Line 47, "$\Delta T_1 \cdot E_B/T$" should read -- $\Delta T_1 \bullet E_B/T$ --.  
Line 53, equation (9), "sigG=$E_G+\Delta T_2 \cdot E_B/T+\Delta T_1 \cdot E_B/T=E_G+(\Delta T_2+\Delta T_1)E_B/T$" should read -- sigG=$E_G+\Delta T_2 \bullet E_B/T+\Delta T_1 \bullet E_B/T=E_G+(\Delta T_2+\Delta T_1)E_B/T$ --.  
Line 59, "$(\Delta T_2+\Delta T_1)E_B/T=C \cdot sigB=C \cdot (T+\Delta T_1)E_B/T$" should read -- $(\Delta T_2+\Delta T_1)E_B/T=C \bullet sigB=C \bullet (T+\Delta T_1)E_B/T$ --.

Column 7,  
Line 1, equation (11), "$E_G$=sigG-C·sigB" should read -- $E_G$=sigG-C•sigB --.  
Line 4, "—C, C0" should read -- -C, C0 --.  
Line 64, equation (13), "sigG=$E_G+\Delta T_2 \cdot E_{Bn}/T+\Delta T_1 \cdot E_{Bn+1}/T$" should read --  
sigG=$E_G+\Delta T_2 \bullet E_{Bn}/T+\Delta T_1 \bullet E_{Bn+1}/T$ --.

Column 8,  
Line 1, equation (14), "$\Delta T_2 \cdot E_{Bn}/T+\Delta T_1 \cdot E_{Bn+1}/T=\Delta T_2 \cdot T \cdot sigBn/T \cdot (T+\Delta T_1)+\Delta T_1 \cdot T \cdot sigBn+1/T \cdot (T+\Delta T_1)=\Delta T_2 \cdot sigBn/(T+\Delta T_1)+\Delta T_1 \cdot sigBn+1/(T+\Delta T_1)$" should read -- $\Delta T_2 \bullet E_{Bn}/T+\Delta T_1 \bullet E_{Bn+1}/T=\Delta T_2 \bullet T \bullet sigBn/T \bullet (T+\Delta T_1)+\Delta T_1 \bullet T \bullet sigBn+1/T \bullet (T+\Delta T_1)=\Delta T_2 \bullet sigBn/(T+\Delta T_1)+\Delta T_1 \bullet sigBn+1/(T+\Delta T_1)$ --.

Column 9,  
Line 60, equation (20), "$K_j=2 \cdot G_{Aj}-G_{Bj}$" should read -- $K_j=2 \bullet G_{Aj}-G_{Bj}$ --.

UNITED STATES PATENT AND TRADEMARK OFFICE
CERTIFICATE OF CORRECTION

PATENT NO. : 6,078,685
DATED : June 20, 2000
INVENTOR(S) : Takashi Kawai et al.

It is certified that error appears in the above-identified patent and that said Letters Patent is hereby corrected as shown below:

Column 10,
Line 46, "operators instruction" should read -- operator's instruction --.

Column 11,
Line 43, "(2·ΔT)" should read -- (2•ΔT) --.
Line 50, equation (23), "$G_{Cj}=g_{Cj}+2·K_j$" should read -- $G_{Cj}=g_{Cj}+2•K_j$ --.

Signed and Sealed this

Twenty-fifth Day of December, 2001

*Attest:*

*Attesting Officer*

JAMES E. ROGAN
*Director of the United States Patent and Trademark Office*